US010931629B2

(12) United States Patent
Chander et al.

(10) Patent No.: US 10,931,629 B2
(45) Date of Patent: Feb. 23, 2021

(54) TECHNIQUES FOR MANAGING SOFTWARE DEFINED NETWORKING CONTROLLER IN-BAND COMMUNICATIONS IN A DATA CENTER NETWORK

(71) Applicant: Cisco Technology, Inc., San Jose, CA (US)

(72) Inventors: Vijay Chander, San Ramon, CA (US); Yibin Yang, San Jose, CA (US); Praveen Jain, Cupertino, CA (US); Munish Mehta, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/236,757

(22) Filed: Dec. 31, 2018

(65) Prior Publication Data
US 2019/0141010 A1    May 9, 2019

Related U.S. Application Data

(63) Continuation of application No. 15/208,018, filed on Jul. 12, 2016, now Pat. No. 10,171,357.
(Continued)

(51) Int. Cl.
*H04L 29/12* (2006.01)
*H04L 12/46* (2006.01)
*H04L 12/751* (2013.01)

(52) U.S. Cl.
CPC ...... *H04L 61/2592* (2013.01); *H04L 12/4641* (2013.01); *H04L 45/02* (2013.01); *H04L 61/2514* (2013.01); *H04L 61/2521* (2013.01)

(58) Field of Classification Search
CPC . H04L 61/2592; H04L 45/02; H04L 12/4641; H04L 61/2521; H04L 61/2514; H04L 12/4645; H04L 12/4633
See application file for complete search history.

(56) References Cited

U.S. PATENT DOCUMENTS

| 5,742,829 A | 4/1998 | Davis et al. |
| 5,903,545 A | 5/1999 | Sabourin et al. |

(Continued)

FOREIGN PATENT DOCUMENTS

| CN | 101093452 | 12/2007 |
| CN | 101770551 | 7/2010 |

(Continued)

OTHER PUBLICATIONS

Arista Networks, Inc., "Application Visibility and Network Telemtry using Splunk," Arista White Paper, Nov. 2013, 11 pages.
(Continued)

*Primary Examiner* — Jay P Patel
(74) *Attorney, Agent, or Firm* — Polsinelli PC

(57) ABSTRACT

According to one or more embodiments of this disclosure, a network controller in a data center network establishes a translation table for in-band traffic in a data center network, the translation table resolves ambiguous network addresses based on one or more of a virtual network identifier (VNID), a routable tenant address, or a unique loopback address. The network controller device receives packets originating from applications and/or an endpoints operating in a network segment associated with a VNID. The network controller device translates, using the translation table, unique loopback addresses and/or routable tenant addresses associated with the packets into routable tenant addresses and/or unique loopback addresses, respectively.

20 Claims, 9 Drawing Sheets

Related U.S. Application Data

(60) Provisional application No. 62/342,746, filed on May 27, 2016.

(56) References Cited

U.S. PATENT DOCUMENTS

| | | |
|---|---|---|
| 6,012,096 A | 1/2000 | Link et al. |
| 6,144,962 A | 11/2000 | Weinberg et al. |
| 6,247,058 B1 | 6/2001 | Miller et al. |
| 6,330,562 B1 | 12/2001 | Boden et al. |
| 6,525,658 B2 | 2/2003 | Streetman et al. |
| 6,597,663 B1 | 7/2003 | Rekhter |
| 6,611,896 B1 | 8/2003 | Mason, Jr. et al. |
| 6,728,779 B1 | 4/2004 | Griffin et al. |
| 6,801,878 B1 | 10/2004 | Hintz et al. |
| 6,847,993 B1 | 1/2005 | Novaes et al. |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 7,002,464 B2 | 2/2006 | Bruemmer et al. |
| 7,096,368 B2 | 8/2006 | Kouznetsov et al. |
| 7,120,934 B2 | 10/2006 | Ishikawa |
| 7,162,643 B1 | 1/2007 | Sankaran et al. |
| 7,181,769 B1 | 2/2007 | Keanini et al. |
| 7,185,103 B1 | 2/2007 | Jain |
| 7,337,206 B1 | 2/2008 | Wen et al. |
| 7,353,511 B1 | 4/2008 | Ziese |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,530,105 B2 | 5/2009 | Gilbert et al. |
| 7,610,330 B1 | 10/2009 | Quinn et al. |
| 7,633,942 B2 | 12/2009 | Bearden et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,752,307 B2 | 7/2010 | Takara |
| 7,774,498 B1 | 8/2010 | Kraemer et al. |
| 7,783,457 B2 | 8/2010 | Cunningham |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,056,134 B1 | 11/2011 | Ogilvie |
| 8,135,657 B2 | 3/2012 | Kapoor et al. |
| 8,156,430 B2 | 4/2012 | Newman |
| 8,181,248 B2 | 5/2012 | Oh et al. |
| 8,185,824 B1 | 5/2012 | Mitchell et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,365,286 B2 | 1/2013 | Poston |
| 8,370,407 B1 | 2/2013 | Devarajan et al. |
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,413,235 B1 | 4/2013 | Chen et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,489,765 B2 | 7/2013 | Vasseur et al. |
| 8,516,590 B1 | 8/2013 | Ranadive et al. |
| 8,527,977 B1 | 9/2013 | Cheng et al. |
| 8,549,635 B2 | 10/2013 | Muttik et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,572,739 B1 | 10/2013 | Cruz et al. |
| 8,588,081 B2 | 11/2013 | Salam et al. |
| 8,600,726 B1 | 12/2013 | Varshney et al. |
| 8,613,084 B2 | 12/2013 | Dalcher |
| 8,630,316 B2 | 1/2014 | Haba |
| 8,631,464 B2 | 1/2014 | Belakhdar et al. |
| 8,640,086 B2 | 1/2014 | Bonev et al. |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,713,676 B2 | 4/2014 | Pandrangi et al. |
| 8,719,452 B1 | 5/2014 | Ding et al. |
| 8,719,835 B2 | 5/2014 | Kanso et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,776,180 B2 | 7/2014 | Kumar et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,908,685 B2 | 12/2014 | Patel et al. |
| 8,931,043 B2 | 1/2015 | Cooper et al. |
| 8,954,610 B2 | 2/2015 | Berke et al. |
| 8,955,124 B2 | 2/2015 | Kim et al. |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |
| 8,997,227 B1 | 3/2015 | Mhatre et al. |
| 9,015,716 B2 | 4/2015 | Fletcher et al. |
| 9,071,575 B2 | 6/2015 | Lemaster et al. |
| 9,088,598 B1 | 7/2015 | Zhang et al. |
| 9,110,905 B2 | 8/2015 | Polley et al. |
| 9,117,075 B1 | 8/2015 | Yeh |
| 9,152,789 B2 | 10/2015 | Natarajan et al. |
| 9,160,764 B2 | 10/2015 | Stiansen et al. |
| 9,178,906 B1 | 11/2015 | Chen et al. |
| 9,185,127 B2 | 11/2015 | Neou et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,773 B2 | 1/2016 | Degioanni |
| 9,258,217 B2 | 2/2016 | Duffield et al. |
| 9,281,940 B2 | 3/2016 | Matsuda et al. |
| 9,294,486 B1 | 3/2016 | Chiang et al. |
| 9,317,574 B1 | 4/2016 | Brisebois et al. |
| 9,319,384 B2 | 4/2016 | Yan et al. |
| 9,369,479 B2 | 6/2016 | Lin |
| 9,396,327 B2 | 6/2016 | Shimomura et al. |
| 9,405,903 B1 | 8/2016 | Xie et al. |
| 9,418,222 B1 | 8/2016 | Rivera et al. |
| 9,426,068 B2 | 8/2016 | Dunbar et al. |
| 9,454,324 B1 | 9/2016 | Madhavapeddi |
| 9,501,744 B1 | 11/2016 | Brisebois et al. |
| 9,634,915 B2 | 4/2017 | Bley |

(56) References Cited

U.S. PATENT DOCUMENTS

| | | |
|---|---|---|
| 9,645,892 B1 | 5/2017 | Patwardhan |
| 9,733,973 B2 | 8/2017 | Prasad et al. |
| 2002/0053033 A1 | 5/2002 | Cooper et al. |
| 2002/0103793 A1 | 8/2002 | Koller et al. |
| 2002/0141343 A1 | 10/2002 | Bays |
| 2002/0184393 A1 | 12/2002 | Leddy et al. |
| 2003/0097439 A1 | 5/2003 | Strayer et al. |
| 2003/0145232 A1 | 7/2003 | Poletto et al. |
| 2003/0154399 A1 | 8/2003 | Zuk et al. |
| 2004/0030776 A1 | 2/2004 | Cantrell et al. |
| 2004/0243533 A1 | 12/2004 | Dempster et al. |
| 2004/0268149 A1 | 12/2004 | Aaron |
| 2005/0039104 A1 | 2/2005 | Shah et al. |
| 2005/0063377 A1 | 3/2005 | Bryant et al. |
| 2005/0166066 A1 | 7/2005 | Ahuja et al. |
| 2005/0185621 A1 | 8/2005 | Sivakumar et al. |
| 2005/0207376 A1 | 9/2005 | Ashwood-Smith et al. |
| 2005/0257244 A1 | 11/2005 | Joly et al. |
| 2005/0289244 A1 | 12/2005 | Sahu et al. |
| 2006/0048218 A1 | 3/2006 | Lingafelt et al. |
| 2006/0080733 A1 | 4/2006 | Khosmood et al. |
| 2006/0095968 A1 | 5/2006 | Portolani et al. |
| 2006/0156408 A1 | 7/2006 | Himberger et al. |
| 2006/0195448 A1 | 8/2006 | Newport |
| 2006/0272018 A1 | 11/2006 | Fouant |
| 2006/0274659 A1 | 12/2006 | Ouderkirk |
| 2006/0294219 A1 | 12/2006 | Ogawa et al. |
| 2007/0044147 A1 | 2/2007 | Choi et al. |
| 2007/0097976 A1 | 5/2007 | Wood et al. |
| 2007/0169179 A1 | 7/2007 | Narad |
| 2007/0195729 A1 | 8/2007 | Li et al. |
| 2007/0195797 A1 | 8/2007 | Patel et al. |
| 2007/0211637 A1 | 9/2007 | Mitchell |
| 2007/0300061 A1 | 12/2007 | Kim et al. |
| 2008/0022385 A1 | 1/2008 | Crowell et al. |
| 2008/0056124 A1 | 3/2008 | Nanda et al. |
| 2008/0082662 A1 | 4/2008 | Danliker et al. |
| 2008/0101234 A1 | 5/2008 | Nakil et al. |
| 2008/0126534 A1 | 5/2008 | Mueller et al. |
| 2008/0250122 A1 | 10/2008 | Zsigmond et al. |
| 2008/0270199 A1 | 10/2008 | Chess et al. |
| 2008/0301765 A1 | 12/2008 | Nicol et al. |
| 2009/0064332 A1 | 3/2009 | Porras et al. |
| 2009/0133126 A1 | 5/2009 | Jang et al. |
| 2009/0241170 A1 | 9/2009 | Kumar et al. |
| 2009/0307753 A1 | 12/2009 | Dupont et al. |
| 2009/0313373 A1 | 12/2009 | Hanna et al. |
| 2009/0313698 A1 | 12/2009 | Wahl |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0220584 A1 | 9/2010 | DeHaan et al. |
| 2010/0235514 A1 | 9/2010 | Beachem |
| 2010/0235915 A1 | 9/2010 | Memon et al. |
| 2010/0303240 A1 | 12/2010 | Beachem |
| 2010/0319060 A1 | 12/2010 | Aiken et al. |
| 2011/0010585 A1 | 1/2011 | Bugenhagen et al. |
| 2011/0055381 A1 | 3/2011 | Narasimhan et al. |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0083125 A1 | 4/2011 | Komatsu et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0196957 A1 | 8/2011 | Ayachitula et al. |
| 2011/0202655 A1 | 8/2011 | Sharma et al. |
| 2011/0225207 A1 | 9/2011 | Subramanian et al. |
| 2011/0228696 A1 | 9/2011 | Agarwal et al. |
| 2011/0277034 A1 | 11/2011 | Hanson |
| 2011/0302652 A1 | 12/2011 | Westerfeld |
| 2011/0314148 A1 | 12/2011 | Petersen et al. |
| 2012/0005542 A1 | 1/2012 | Petersen et al. |
| 2012/0079592 A1 | 3/2012 | Pandrangi |
| 2012/0102361 A1 | 4/2012 | Sass et al. |
| 2012/0102543 A1 | 4/2012 | Kohli et al. |
| 2012/0117226 A1 | 5/2012 | Tanaka et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0233473 A1 | 9/2012 | Vasseur et al. |
| 2012/0240232 A1 | 9/2012 | Azuma |
| 2012/0246303 A1 | 9/2012 | Petersen et al. |
| 2012/0278021 A1 | 11/2012 | Lin et al. |
| 2013/0003538 A1 | 1/2013 | Greenburg et al. |
| 2013/0006935 A1 | 1/2013 | Grisby |
| 2013/0038358 A1 | 2/2013 | Cook et al. |
| 2013/0086272 A1 | 4/2013 | Chen et al. |
| 2013/0103827 A1 | 4/2013 | Dunlap et al. |
| 2013/0145099 A1 | 6/2013 | Liu et al. |
| 2013/0159999 A1 | 6/2013 | Chiueh et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198839 A1 | 8/2013 | Wei et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0333029 A1 | 12/2013 | Chesla et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0033193 A1 | 1/2014 | Palaniappan |
| 2014/0047185 A1 | 2/2014 | Peterson et al. |
| 2014/0047372 A1 | 2/2014 | Gnezdov et al. |
| 2014/0059200 A1 | 2/2014 | Nguyen et al. |
| 2014/0089494 A1 | 3/2014 | Dasari et al. |
| 2014/0096058 A1 | 4/2014 | Molesky et al. |
| 2014/0115219 A1 | 4/2014 | Ajanovic et al. |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0164607 A1 | 6/2014 | Bai et al. |
| 2014/0165207 A1 | 6/2014 | Engel et al. |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0215573 A1 | 7/2014 | Cepuran |
| 2014/0215621 A1 | 7/2014 | Xaypanya et al. |
| 2014/0281030 A1 | 9/2014 | Cui et al. |
| 2014/0289854 A1 | 9/2014 | Mahvi |
| 2014/0298461 A1 | 10/2014 | Hohndel et al. |
| 2014/0317737 A1 | 10/2014 | Shin et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |

(56) References Cited

U.S. PATENT DOCUMENTS

| | | | |
|---|---|---|---|
| 2014/0373146 A1* | 12/2014 | Murthy | H04L 63/1408 726/23 |
| 2015/0009840 A1 | 1/2015 | Pruthi et al. | |
| 2015/0026809 A1 | 1/2015 | Altman et al. | |
| 2015/0033305 A1 | 1/2015 | Shear et al. | |
| 2015/0036533 A1 | 2/2015 | Sodhi et al. | |
| 2015/0039751 A1 | 2/2015 | Harrigan et al. | |
| 2015/0046882 A1 | 2/2015 | Menyhart et al. | |
| 2015/0058976 A1 | 2/2015 | Carney et al. | |
| 2015/0067143 A1 | 3/2015 | Babakhan et al. | |
| 2015/0082151 A1 | 3/2015 | Liang et al. | |
| 2015/0082430 A1 | 3/2015 | Sridhara et al. | |
| 2015/0085665 A1 | 3/2015 | Kompella et al. | |
| 2015/0095332 A1 | 4/2015 | Beisiegel et al. | |
| 2015/0112933 A1 | 4/2015 | Satapathy | |
| 2015/0113133 A1 | 4/2015 | Srinivas et al. | |
| 2015/0124608 A1 | 5/2015 | Agarwal et al. | |
| 2015/0124821 A1* | 5/2015 | Chu | H04L 45/745 370/392 |
| 2015/0128133 A1 | 5/2015 | Pohlmann | |
| 2015/0138993 A1 | 5/2015 | Forster et al. | |
| 2015/0142962 A1 | 5/2015 | Srinivas et al. | |
| 2015/0195291 A1 | 7/2015 | Zuk et al. | |
| 2015/0249622 A1 | 9/2015 | Phillips et al. | |
| 2015/0256555 A1 | 9/2015 | Choi et al. | |
| 2015/0261842 A1 | 9/2015 | Huang et al. | |
| 2015/0261886 A1 | 9/2015 | Wu et al. | |
| 2015/0271255 A1 | 9/2015 | Mackay et al. | |
| 2015/0295945 A1 | 10/2015 | Canzanese, Jr. et al. | |
| 2015/0356297 A1 | 10/2015 | Yang Ming et al. | |
| 2015/0347554 A1 | 12/2015 | Vasantham et al. | |
| 2015/0358352 A1 | 12/2015 | Chasin et al. | |
| 2016/0006753 A1 | 1/2016 | McDaid et al. | |
| 2016/0021131 A1 | 1/2016 | Heilig | |
| 2016/0026552 A1 | 1/2016 | Holden et al. | |
| 2016/0036837 A1 | 2/2016 | Jain et al. | |
| 2016/0050132 A1 | 2/2016 | Zhang et al. | |
| 2016/0072815 A1 | 3/2016 | Rieke et al. | |
| 2016/0094529 A1 | 3/2016 | Mityagin | |
| 2016/0103692 A1 | 4/2016 | Guntaka et al. | |
| 2016/0105350 A1 | 4/2016 | Greifeneder et al. | |
| 2016/0112270 A1 | 4/2016 | Danait et al. | |
| 2016/0117185 A1* | 4/2016 | Fang | H04L 47/825 718/1 |
| 2016/0119219 A1* | 4/2016 | Fang | G06F 9/45558 370/392 |
| 2016/0119234 A1 | 4/2016 | Valencia Lopez et al. | |
| 2016/0127395 A1 | 5/2016 | Underwood et al. | |
| 2016/0147585 A1 | 5/2016 | Konig et al. | |
| 2016/0162308 A1 | 6/2016 | Chen et al. | |
| 2016/0162312 A1 | 6/2016 | Doherty et al. | |
| 2016/0173446 A1 | 6/2016 | Nantel | |
| 2016/0191476 A1 | 6/2016 | Schutz Harald et al. | |
| 2016/0205002 A1 | 7/2016 | Rieke et al. | |
| 2016/0216994 A1 | 7/2016 | Sefidcon et al. | |
| 2016/0294691 A1 | 10/2016 | Joshi | |
| 2016/0308908 A1 | 10/2016 | Kirby et al. | |
| 2016/0357424 A1 | 12/2016 | Pang et al. | |
| 2016/0357546 A1 | 12/2016 | Chang et al. | |
| 2016/0357587 A1 | 12/2016 | Yadav et al. | |
| 2016/0357957 A1 | 12/2016 | Deen et al. | |
| 2016/0359592 A1 | 12/2016 | Kulshreshtha et al. | |
| 2016/0359628 A1 | 12/2016 | Singh et al. | |
| 2016/0359658 A1 | 12/2016 | Yadav et al. | |
| 2016/0359673 A1 | 12/2016 | Gupta et al. | |
| 2016/0359677 A1 | 12/2016 | Kulshreshtha et al. | |
| 2016/0359678 A1 | 12/2016 | Madani et al. | |
| 2016/0359679 A1 | 12/2016 | Parasdehgheibi et al. | |
| 2016/0359680 A1 | 12/2016 | Parasdehgheibi et al. | |
| 2016/0359686 A1 | 12/2016 | Parasdehgheibi et al. | |
| 2016/0359696 A1 | 12/2016 | Yadav et al. | |
| 2016/0359697 A1 | 12/2016 | Scheib et al. | |
| 2016/0359698 A1 | 12/2016 | Deen et al. | |
| 2016/0359699 A1 | 12/2016 | Gandham et al. | |
| 2016/0359700 A1 | 12/2016 | Pang et al. | |
| 2016/0359701 A1 | 12/2016 | Pang et al. | |
| 2016/0359703 A1 | 12/2016 | Gandham et al. | |
| 2016/0359704 A1 | 12/2016 | Gandham et al. | |
| 2016/0359705 A1 | 12/2016 | Parasdehgheibi et al. | |
| 2016/0359708 A1 | 12/2016 | Gandham et al. | |
| 2016/0359709 A1 | 12/2016 | Deen et al. | |
| 2016/0359711 A1 | 12/2016 | Deen et al. | |
| 2016/0359712 A1 | 12/2016 | Alizadeh Attar et al. | |
| 2016/0359740 A1 | 12/2016 | Parasdehgheibi et al. | |
| 2016/0359759 A1 | 12/2016 | Singh et al. | |
| 2016/0359872 A1 | 12/2016 | Yadav et al. | |
| 2016/0359877 A1 | 12/2016 | Kulshreshtha et al. | |
| 2016/0359878 A1 | 12/2016 | Prasad et al. | |
| 2016/0359879 A1 | 12/2016 | Deen et al. | |
| 2016/0359880 A1 | 12/2016 | Pang et al. | |
| 2016/0359881 A1 | 12/2016 | Yadav et al. | |
| 2016/0359888 A1 | 12/2016 | Gupta et al. | |
| 2016/0359889 A1 | 12/2016 | Yadav et al. | |
| 2016/0359890 A1 | 12/2016 | Deen et al. | |
| 2016/0359891 A1 | 12/2016 | Pang et al. | |
| 2016/0359897 A1 | 12/2016 | Yadav et al. | |
| 2016/0359912 A1 | 12/2016 | Gupta et al. | |
| 2016/0359913 A1 | 12/2016 | Gupta et al. | |
| 2016/0359914 A1 | 12/2016 | Deen et al. | |
| 2016/0359915 A1 | 12/2016 | Gupta et al. | |
| 2016/0359917 A1 | 12/2016 | Rao et al. | |
| 2016/0373481 A1 | 12/2016 | Sultan et al. | |
| 2017/0034018 A1 | 2/2017 | Parasdehgheibi et al. | |
| 2017/0237650 A1* | 8/2017 | Beeram | H04L 12/4633 370/390 |
| 2017/0317974 A1* | 11/2017 | Masurekar | H04L 67/2804 |
| 2018/0006911 A1 | 1/2018 | Dickey | |
| 2018/0367409 A1* | 12/2018 | Zhang | H04L 45/04 |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| EP | 0811942 | 12/1997 |
| EP | 1383261 | 1/2004 |
| EP | 1450511 | 8/2004 |
| EP | 2045974 | 4/2008 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2015/099778 | 7/2015 |
| WO | WO 2016/004075 | 1/2016 |
| WO | WO 2016/019523 | 2/2016 |

OTHER PUBLICATIONS

Australian Government Department of Defence, Intelligence and Security, "Top 4 Strategies to Mitigate Targeted Cyber Intrusions," Cyber Security Operations Centre Jul. 2013, http://www.asd.gov.au/infosec/top-mitigations/top-4-strategies-explained.htm.

Author Unknown, "Blacklists & Dynamic Reputation: Understanding Why the Evolving Threat Eludes Blacklists," www.dambala.com 9 pages, Dambala, Atlanta, GA, USA.

Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.

Backes, Michael, et al., "Data Lineage in Malicious Environments," IEEE 2015, pp. 1-13.

Bauch, Petr, "Reader's Report of Master's Thesis, Analysis and Testing of Distributed NoSQL Datastore Riak," May 28, 2015, Brno. 2 pages.

Bayati, Mohsen, et al., "Message-Passing Algorithms for Sparse Network Alignment," Mar. 2013, 31 pages.

(56) References Cited

OTHER PUBLICATIONS

Berezinski, Przemyslaw, et al., "An Entropy-Based Network Anomaly Detection Method," Entropy, 2015, vol. 17, www.mdpi.com/journal/entropy, pp. 2367-2408.
Berthier, Robin, et al. "Nfsight: Netflow-based Network Awareness Tool," 2010, 16 pages.
Bhuyan, Dhiraj, "Fighting Bots and Botnets," 2006, pp. 23-28.
Blair, Dana, et al., U.S. Appl. No. 62/106,006, filed Jan. 21, 2015, entitled "Monitoring Network Policy Compliance."
Bosch, Greg, "Virtualization," 2010, 33 pages.
Breen, Christopher, "MAC 911, How to dismiss Mac App Store Notifications," Macworld.com, Mar. 24, 2014, 3 pages.
Chandran, Midhun, et al., "Monitoring in a Virtualized Environment," GSTF International Journal on Computing, vol. 1, No. 1, Aug. 2010.
Chari, Suresh, et al., "Ensuring continuous compliance through reconciling policy with usage," Proceedings of the $18^{th}$ ACM symposium on Access control models and technologies (SACMAT '13). ACM, New York, NY, USA, 49-60.
Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.
Chou, C.W., et al., "Optical Clocks and Relativity," Science vol. 329, Sep. 24, 2010, pp. 1630-1633.
Cisco Systems, "Cisco Network Analysis Modules (NAM) Tutorial," Cisco Systems, Inc., Version 3.5.
Cisco Systems, Inc., "Addressing Compliance from One Infrastructure: Cisco Unified Compliance Solution Framework," 2014.
Cisco Systems, Inc., "Cisco Application Dependency Mapping Service," 2009.
Cisco Systems, Inc., "White Paper—New Cisco Technologies Help Customers Achieve Regulatory Compliance," 1992-2008.
Cisco Systems, Inc., "A Cisco Guide to Defending Against Distributed Denial of Service Attacks," May 3, 2016, 34 pages.
Cisco Systems, Inc., "Cisco Application Visibility and Control," Oct. 2011, 2 pages.
Cisco Systems, Inc., "Cisco Tetration Platform Data Sheet", Updated Mar. 5, 2018, 21 pages.
Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.
Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.
Duan, Yiheng, et al., Detective: Automatically Identify and Analyze Malware Processes in Forensic Scenarios via DLLs, IEEE ICC 2015—Next Generation Networking Symposium, pp. 5691-5696.
Feinstein, Laura, et al., "Statistical Approaches to DDoS Attack Detection and Response," Proceedings of the DARPA Information Survivability Conference and Exposition (DISCEX '03), Apr. 2003, 12 pages.
George, Ashley, et al., "NetPal: A Dynamic Network Administration Knowledge Base," 2008, pp. 1-14.
Goldsteen, Abigail, et al., "A Tool for Monitoring and Maintaining System Trustworthiness at Run Time," REFSQ (2015), pp. 142-147.
Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.
Heckman, Sarah, et al., "On Establishing a Benchmark for Evaluating Static Analysis Alert Prioritization and Classification Techniques," IEEE, 2008; 10 pages.
Hewlett-Packard, "Effective use of reputation intelligence in a security operations center," Jul. 2013, 6 pages.
Hideshima, Yusuke, et al., "STARMINE: A Visualization System for Cyber Attacks," https://www.researchgate.net/publication/221536306, Feb. 2006, 9 pages.
Huang, Hing-Jie, et al., "Clock Skew Based Node Identification in Wireless Sensor Networks," IEEE, 2008, 5 pages.
InternetPerils, Inc., "Control Your Internet Business Risk," 2003-2015, https://www.internetperils.com.
Ives, Herbert, E., et al., "An Experimental Study of the Rate of a Moving Atomic Clock," Journal of the Optical Society of America, vol. 28, No. 7, Jul. 1938, pp. 215-226.
Janoff, Christian, et al., "Cisco Compliance Solution for HIPAA Security Rule Design and Implementation Guide," Cisco Systems, Inc., Updated Nov. 14, 2015, part 1 of 2, 350 pages.
Janoff, Christian, et al., "Cisco Compliance Solution for HIPAA Security Rule Design and Implementation Guide," Cisco Systems, Inc., Updated Nov. 14, 2015, part 2 of 2, 588 pages.
Kerrison, Adam, et al., "Four Steps to Faster, Better Application Dependency Mapping—Laying the Foundation for Effective Business Service Models," BMCSoftware, 2011.
Kim, Myung-Sup, et al. "A Flow-based Method for Abnormal Network Traffic Detection, " IEEE, 2004, pp. 599-612.
Kraemer, Brian, "Get to know your data center with CMDB," TechTarget, Apr. 5, 2006, http://searchdatacenter.techtarget.com/news/118820/Get-to-know-your-data-center-with-CMDB.
Lab SKU, "VMware Hands-on Labs—HOL-SDC-1301" Version: 20140321-160709, 2013; http://docs.hol.vmware.com/HOL-2013/holsdc-1301_html_en/ (part 1 of 2).
Lab SKU, "VMware Hands-on Labs—HOL-SDC-1301" Version: 20140321-160709, 2013; http://docs.hol.vmware.com/HOL-2013/holsdc-1301_html_en/ (part 2 of 2).
Lachance, Michael, "Dirty Little Secrets of Application Dependency Mapping," Dec. 26, 2007.
Landman, Yoav, et al., "Dependency Analyzer," Feb. 14, 2008, http://jfrog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.
Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.
Lu, Zhonghai, et al., "Cluster-based Simulated Annealing for Mapping Cores onto 2D Mesh Networks on Chip," Design and Diagnostics of Electronic Circuits and Systems, pp. 1, 6, 16-18, Apr. 2008.
Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers INFOCOM, Feb. 2012, 9 pages.
Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Neverfail, "Neverfail IT Continuity Architect," 2015, https://web.archive.org/web/20150908090456/http://www.neverfailgroup.com/products/it-continuity-architect.
Nilsson, Dennis K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.
Nunnally, Troy, et al., "P3D: A Parallel 3D Coordinate Visualization for Advanced Network Scans," IEEE 2013, Jun. 9-13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pp. 1-16.

(56) References Cited

OTHER PUBLICATIONS

Pathway Systems International Inc., "How Blueprints does Integration," Apr. 15, 2014, 9 pages, http://pathwaysystems.com/company-blog/.

Pathway Systems International Inc., "What is Blueprints?" 2010-2016, http://pathwaysystems.com/blueprints-about/.

Popa, Lucian, et al., "Macroscope: End-Point Approach to Networked Application Dependency Discovery," CoNEXT'09, Dec. 1-4, 2009, Rome, Italy, 12 pages.

Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.

Sachan, Mrinmaya, et al., "Solving Electrical Networks to incorporate Supervision in Random Walks," May 13-17, 2013, pp. 109-110.

Sammarco, Matteo, et al., "Trace Selection for Improved WLAN Monitoring," Aug. 16, 2013, pp. 9-14.

Shneiderman, Ben, et al., "Network Visualization by Semantic Substrates," Visualization and Computer Graphics, vol. 12, No. 5, pp. 733,740, Sep.-Oct. 2006.

Thomas, R., "Bogon Dotted Decimal List," Version 7.0, Team Cymru NOC, Apr. 27, 2012, 5 pages.

Wang, Ru, et al., "Learning directed acyclic graphs via bootstarp aggregating," 2014, 47 pages, http://arxiv.org/abs/1406.2098.

Wang, Yongjun, et al., "A Network Gene-Based Framework for Detecting Advanced Persistent Threats," Nov. 2014, 7 pages.

Witze, Alexandra, "Special relativity aces time trial, 'Time dilation' predicted by Einstein confirmed by lithium ion experiment," Nature, Sep. 19, 2014, 3 pages.

Woodberg, Brad, "Snippet from Juniper SRX Series" Jun. 17, 2013, 1 page, O'Reilly Media, Inc.

Zatrochova, Zuzana, "Analysis and Testing of Distributed NoSQL Datastore Riak," Spring, 2015, 76 pages.

Zhang, Yue, et al., "Cantina: A Content-Based Approach to Detecting Phishing Web Sites," May 8-12, 2007, pp. 639-648.

\* cited by examiner

TECHNIQUES FOR MANAGING SOFTWARE DEFINED NETWORKING CONTROLLER IN-BAND COMMUNICATIONS IN A DATA CENTER NETWORK

CROSS REFERENCE TO RELATED APPLICATIONS

This application is a continuation of U.S. application Ser. No. 15/208,018, filed on Jul. 12, 2016, which in turn, claims priority to U.S. Provisional Patent Application Ser. No. 62/342,746, filed on May 27, 2016, the contents of which are herein incorporated by reference

TECHNICAL FIELD

The present disclosure relates generally to communication networks, and more particularly, to data center networks.

BACKGROUND

An ever increasing demand for cloud-based and virtualized services is changing existing network services and storage environments. For example, existing stand-alone storage environments are rapidly being replaced with large storage environments such as data centers, which provide remote access to computing resources through complex and dynamic networks of devices such as servers, routers, switches, hosts, load-balancers, and the like. However, due to dynamic nature and complex network of network devices, data centers present new challenges regarding performance, latency, reliability, scalability, endpoint migration, traffic isolation, and the like.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

Figure 1:
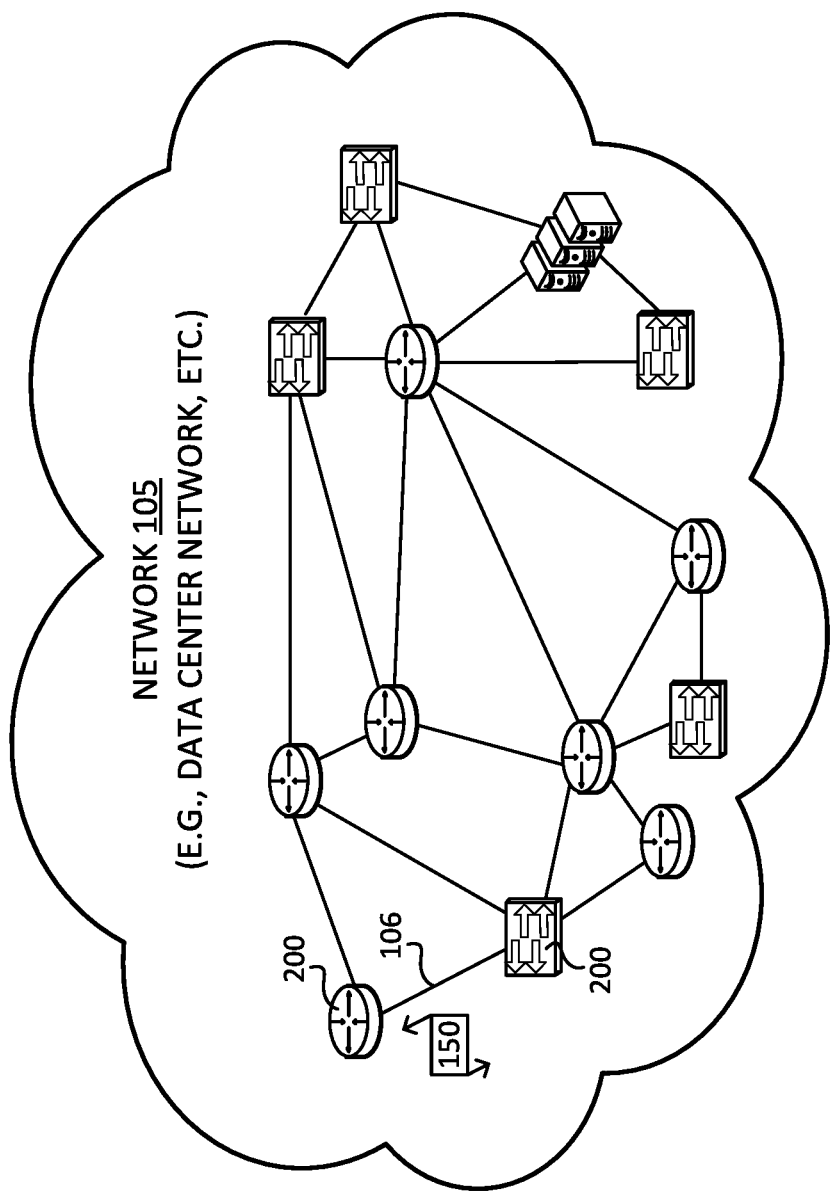
FIG. 1 illustrates an example schematic diagram of a communication network, showing a data center network.

According to one or more embodiments of this disclosure, a software defined networking controller in a data center network establishes a translation table for in-band traffic in a data center network, the translation table resolves ambiguous network addresses based on one or more of a virtual network identifier (VNID), a routable tenant address, or a unique loopback address. The network controller device receives packets originating from applications and/or an endpoints operating in a network segment associated with a VNID, and translates, according to the translation table (and using the VNID), unique loopback addresses and/or routable tenant addresses associated with the packets into routable tenant addresses and/or unique loopback addresses, respectively.

According to another embodiment of this disclosure, the software defined networking controller device establishes a virtual routing and forwarding (VRF) device for each network segment of a plurality of network segments and, for each VRF device, instantiates at least one bound interface for routing packets. The network controller device further maps, in a mapping table, a virtual network identifier (VNID) (associated with a first network segment) to a first bound interface of one of the VRF devices, and links at least one application executing on the network controller device with one of the VRF devices. The network controller device also writes a packet from the at least one application to the one of the VRF devices to route the packet over the first bound interface into the first network segment associated with the VNID mapped to the first bound interface.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As used herein the terms "network segment", "virtual network segment", and "tenant segment", including combinations thereof, generally refers to an overlay network within a data center network.

A communication network is a geographically distributed collection of nodes interconnected by communication links and segments for transporting data between end nodes, such as personal computers and workstations, or other devices, such as sensors, etc. Many types of networks are available, with the types ranging from local area networks (LANs) and wide area networks (WANs) to overlay and software-defined networks, such as virtual extensible local area networks (VXLANs).

LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. Notably, LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Communication networks may be further interconnected by an intermediate network node, such as a router, to extend the effective "size" of each network.

Overlay networks generally allow virtual networks to be created and layered over a physical network infrastructure. Overlay network protocols, such as virtual extensible LAN (VXLAN), network virtualization using generic routing encapsulation (NVGRE), network virtualization overlays (NVO3), stateless transport tunneling (STT), and the like, provide a traffic encapsulation scheme which allows network traffic to be carried across L2 and L3 networks over a logical tunnel. Such logical tunnels can originate and terminate through one or more virtual tunnel endpoints (VTEPs).

Moreover, overlay networks can include virtual segments or network segments, such as VXLAN segments in a VXLAN overlay network, which can include virtual L2 and/or L3 overlay networks over which virtual machines (VMs) communicate. The virtual segments can be identified through a virtual network identifier (VNID), such as a VXLAN network identifier, which can specifically identify an associated virtual network segment or domain.

In this fashion, overlay network protocols provide a traffic encapsulation scheme which allows network traffic to be carried across L2 and L3 networks over a logical tunnel. Such logical tunnels can originate and terminate through virtual tunnel end points (VTEPs). Importantly, in a data center network context, such overlay network protocols provide traffic isolation between network segments associated with different tenants.

FIG. 1 illustrates a schematic diagram of a communication network, particularly a data center network 105. Data center network 105 hosts computing resources (e.g., applications, services, storage, network infrastructure, virtual machines, and the like) and provides one or more remote users (not shown) access to such computing resources. For example, as shown, data center network 105 includes nodes/devices 200 (e.g., routers, sensors, servers, computers, etc.) which operate to route traffic, execute applications, provide storage, and/or otherwise facilitate access to the computing resources in data center network 105.

Operatively nodes/devices 200 communicate over and are interconnected by one or more communication links 106. Communication links 106 may be wired links or shared media (e.g., wireless links, PLC links, etc.) where certain nodes/devices 200 may be in communication with other nodes/devices based on, for example, configuration parameters, distance, signal strength, network/node topology, current operational status, location, network policies, and the like.

Data packets 150, which represent traffic and/or messages, may be exchanged among the nodes/devices 200 in data center network 105 using predefined network communication protocols such as certain known wired protocols (e.g., Interior Gateway Protocol (IGP), Exterior Border Gateway Protocol (E-BGP), TCP/IP, etc.), wireless protocols (e.g., IEEE Std. 802.15.4, WiFi, Bluetooth®, etc.), PLC protocols, VXLAN protocols, or other shared-media protocols where appropriate. In this context, a protocol consists of a set of rules defining how the nodes interact with each other.

Those skilled in the art will understand that any number of nodes, devices, communication links, and the like may be used, and that the view shown herein is for simplicity. Also, those skilled in the art will further understand that while data center network 105 is shown in a particular orientation, such orientation is merely an example for purposes of illustration, not limitation.

Figure 2:
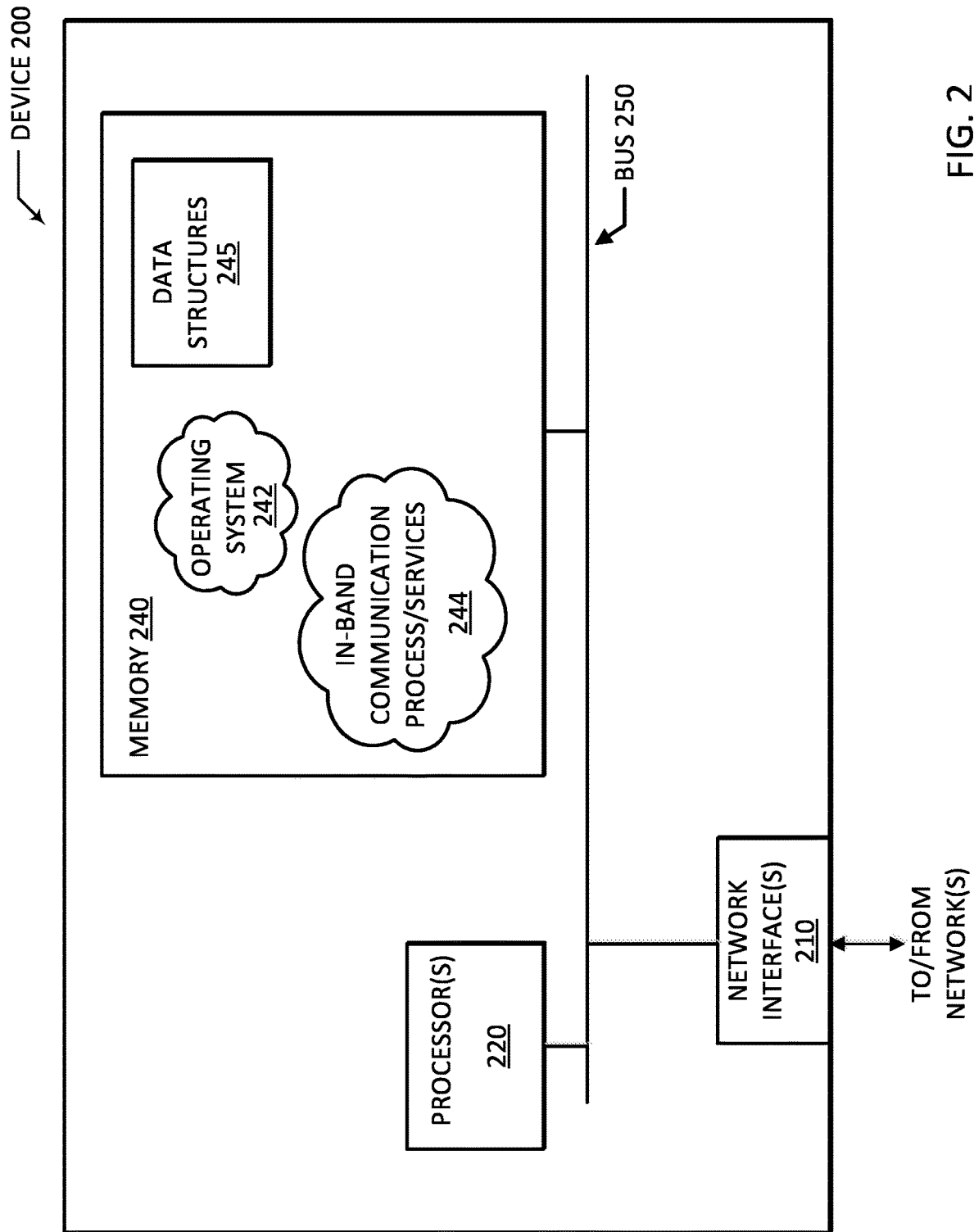
FIG. 2 illustrates a schematic block diagram of an example device, e.g., a network controller device.

FIG. 2 illustrates a schematic block diagram of an example node/device 200 that may be used with one or more embodiments described herein, e.g., as a software defined networking controller device, sometimes referred to as an application policy infrastructure controller (APIC). Device 200 includes one or more network interfaces 210, one or more processors 220, and a memory 240 interconnected by a system bus 250.

Network interface(s) 210 contain the mechanical, electrical, and signaling circuitry for communicating data over links 106 coupled to one or more nodes/devices shown in data center network 105. Network interfaces 210 may be configured to transmit and/or receive data using a variety of different communication protocols, including, inter alia, TCP/IP, UDP, ATM, synchronous optical networks (SONET), VXLAN, wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

Memory 240 includes a plurality of storage locations that are addressable by processor(s) 220 and network interfaces 210 for storing software programs and data structures associated with the embodiments described herein. Processor 220 may comprise necessary elements or logic adapted to execute the software programs and manipulate the data structures 245. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise an in-band communication process/service 244, as described herein.

In addition, in-band communication process (services) 244 may include computer executable instructions executed by the processor 220 to perform functions provided by one or more routing protocols, such as various routing protocols as will be understood by those skilled in the art. These functions may, on capable devices, be configured to manage a routing/forwarding table (a data structure 245) containing, e.g., data used to make routing/forwarding decisions It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Illustratively, the techniques described herein may be performed by hardware, software, and/or firmware, such as in accordance with in-band communication process 244, which may contain computer executable instructions executed by the processor 220 (or independent processor of network interfaces 210) to perform functions described herein.

Figure 3:
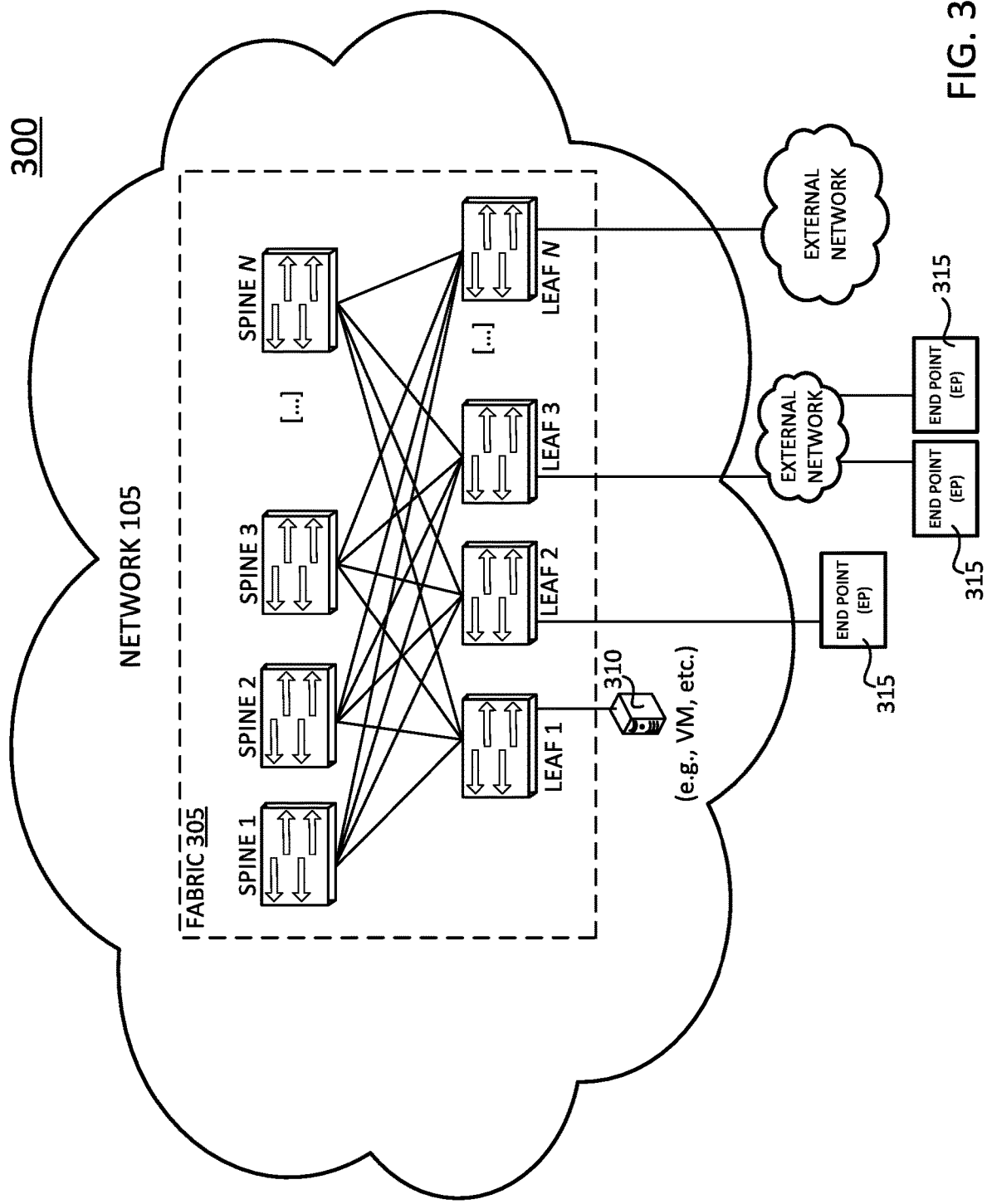
FIG. 3 illustrates an example architecture for the communication network shown in FIG. 1.

FIG. 3 particularly illustrates an example architecture 300 for data center network 105. As shown, architecture 300 includes a fabric 305 formed from a physical underlay of networked devices. Here, network fabric 305 includes spine switches 1-N (spine switch-1-spine switch N), and leaf switches 1-N.

Spine switches 1-N can include, for example, layer 3 (L3) switches, and/or they may also perform L2 functionalities (e.g., supporting certain Ethernet speeds, Ethernet Interfaces, etc.). Generally, spine switches 1-N are configured to lookup destination addresses for a received packet in its respective forwarding table and forward the packet accordingly. However, in some embodiments, one or more of spine switches 1-N may be configured to host a proxy function—here, spine switch 1 operates as a proxy switch. In operation, spine switch 1 matches a received packet to a destination address according to its mapping or routing table on behalf of leaf switches that do not have such mapping. In this fashion, leaf switches forward packets with unknown destination addresses to spine switch 1 for resolution.

For example, spine switch 1 can execute proxy functions to parse an encapsulated packet sent by one or more leaf switches, identify a destination address for the encapsulated packet, and route or forward the encapsulated packet according to the same. In some embodiments, spine switch 1 can perform a local mapping lookup in a database (e.g. a routing table, etc.) to determine a correct locator address of the packet and forward the packet to the locator address without changing certain fields in the header of the packet.

Leaf switches 1-N are interconnected with one or more spine switches to form, in part, fabric 305. Leaf switches 1-N can include access ports (or non-fabric ports) and fabric ports. Fabric ports typically provide uplinks to one or more of the spine switches, while access ports provide connectivity for devices such as device 310 (e.g., a host, a virtual machine (VM), a hypervisor, etc.), endpoint(s) 315, as well as one or more "external networks" (labeled as shown). Leaf switches 1-N may reside at an edge of fabric 305, and can thus represent a physical network edge. In some cases, leaf switches 1-N can include top-of-rack (ToR) switches configured according to a ToR architecture. In other cases, leaf switches 1-N can be virtual switches embedded in one or more servers, or even aggregation switches in any particular topology—e.g., end-of-row (EoR) or middle-of-row (MoR) topologies.

As shown, leaf switches 1-N also connect with devices and/or modules, such as endpoint(s) 315, which represent physical or virtual network devices (e.g., servers, routers, virtual machines (VMs), etc.), external networks, and/or other computing resources. Operatively, network connectivity for fabric 305 flows through leaf switches 1-N, where the leaf switches provide access to fabric 305 as well as interconnectivity between endpoints 315, external networks, etc. Notably, leaf switches 1-N are responsible for applying network policies, routing and/or bridging packets in fabric 305. In some cases, a leaf switch can perform additional functions, including, for example, implementing a mapping cache, sending packets to proxy spines (e.g., when there is a miss in the cache), encapsulating packets, enforcing ingress or egress policies, and the like. In addition, one or more leaf switches may perform virtual switching, including tunneling (e.g., VPN tunneling, etc.), which supports network connectivity through fabric 305, as well as supports communications in an overlay network.

An overlay network typically refers to a network of physical or virtual devices (e.g., servers, hypervisors, applications, endpoints, virtual workloads, etc.), which operate in isolated network segments, important for traffic isolation in various network environments (e.g., multi-tenant, etc.). Operatively, overlay networks isolate traffic amongst tenants on respective network segments within physical and/or virtualized data centers. For example, in a VXLAN overlay network, native frames are encapsulated with an outer IP overlay encapsulation, along with a VXLAN header, and UDP header. Generally, each network segment or VXLAN segment is addressed according to a 24-bit segment ID (e.g., a virtual network identifier or VXLAN network identifier (VNID)), which supports up to 16M VXLAN unique and co-existing network segments in a single administrative domain. The VNID identifies the scope of the inner MAC frame originated by an individual VM; thus, overlapping MAC addresses may exist across segments without resulting in traffic cross-over. The VNID is included in an outer header that encapsulates the inner MAC frame originated by a VM. Due to this encapsulation, VXLAN provides a traffic encapsulation scheme that allows network traffic to be carried across L2 and L3 networks over a logical tunnel, where such logical tunnels can originate and terminate through one or more virtual tunnel endpoints (VTEPs), hosted by a physical switch or physical server and/or implemented in software or other hardware.

As mentioned, leaf switches 1-N support network connectivity through fabric 305 and communications in overlay networks, including such isolated network segments. Further, endpoints 315 may be connected to such overlay networks, and can host virtual workloads, clusters, and/or applications/services that communicate in one or more overlay networks through fabric 305.

Notably, although fabric 305 is illustrated and described as an example leaf-spine architecture employing multiple switches, one of ordinary skill in the art will readily recognize that the subject technology employ any number of devices (e.g., server, routers, etc.) and further, the techniques disclosed herein can be implemented in any network fabric. Indeed, other architectures, designs, infrastructures, and variations are contemplated herein. Further, those skilled in the art will appreciate that the devices shown in fabric 305 are for purposes of illustration, not limitation. Any number of other devices (e.g., route reflectors, etc.) can be included (or excluded) in fabric 305, as appreciated by those skilled in the art.

Figure 4:
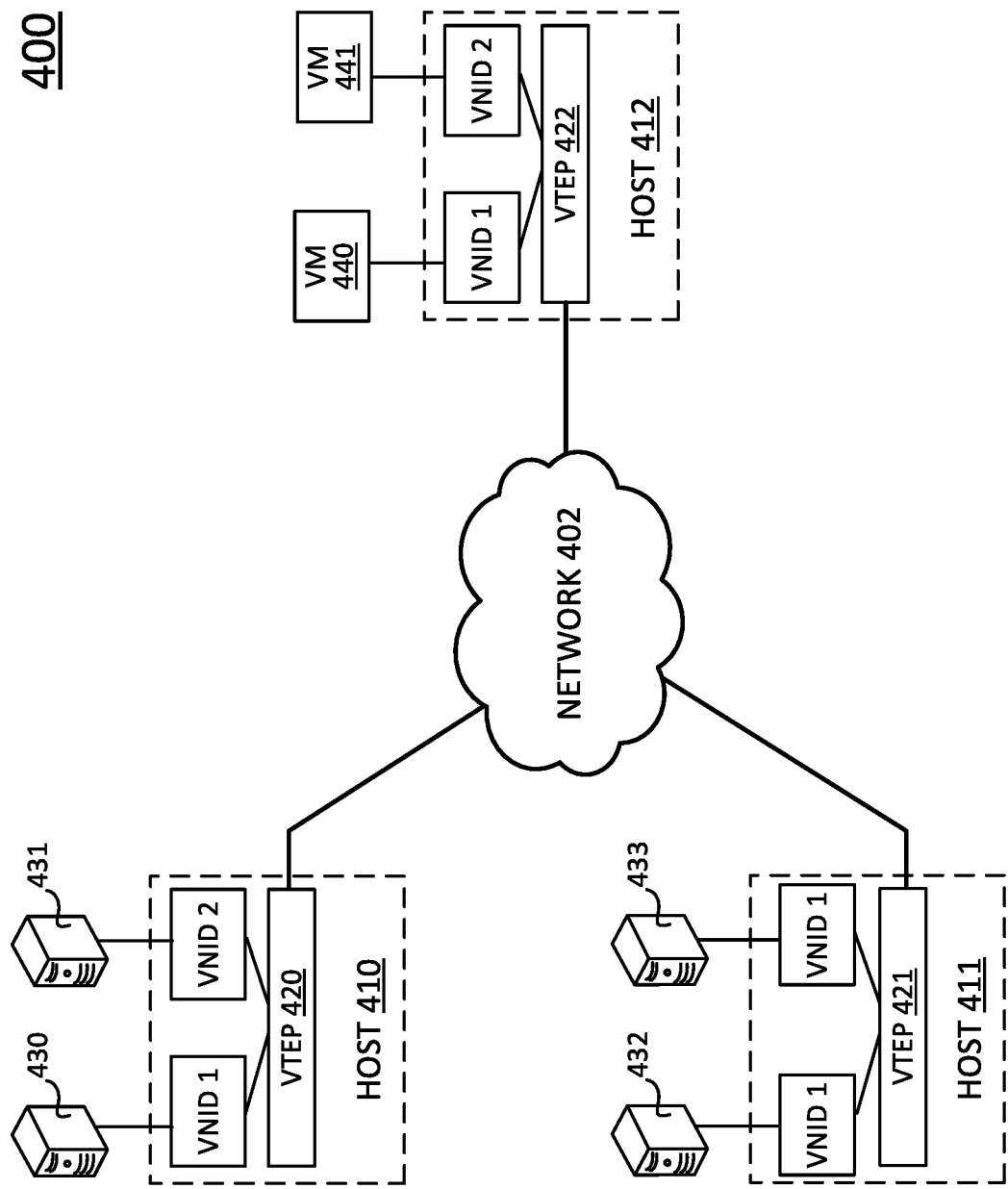
FIG. 4 an example overlay network architecture, showing various interconnected devices.

FIG. 4 illustrates an example overlay network architecture 400, including an overlay network 402 interconnecting various network devices/modules—here, host devices 410, 411, and 412. Host devices 410-412 can include, for example, servers, hypervisors, physical switches (e.g., L2/L2 switches), and the like, and can support virtual workloads such as virtual machines, applications, and/or other services executing thereon. Host devices 410-412 may also communicate with other network devices, such as servers 430, 431, 432, and 433, virtual machines (VMs) 440, 441, and the like.

As shown, host devices 410-412 host respective virtual tunnel endpoints (VTEPs) 420, 421, and 422 that communicate in overlay network 402 (which includes one or more leaf switches 1-N of fabric 305 (ref. FIG. 3, above)). VTEPs 420, 421, and 422 represent virtual nodes and/or switches configured to encapsulate and de-encapsulate traffic according to a specific overlay protocol of overlay network 402.

Servers 430-433 and VMs 440, 441 are connected to a respective VTEP and operate in a network segment identified by a corresponding VNID. Notably, each VTEP can include one or more VNIDs—e.g., VTEPs 420 and 422 include VNID 1 and VNID 2, while VTEP 421 includes VNID 1. As discussed above, traffic in overlay network 402 is logically isolated according to network segments identified by specific VNIDs. For example, network devices residing in a network segment identified by VNID 1 cannot be accessed by network devices residing in a network segment identified by VNID 2. More specifically, as shown, server 430 can communicate with server 432 and VM 440 because these devices each reside in the same network segment identified by VNID 1. Similarly, server 431 can communicate with VM 441 because these devices reside in the same network segment identified by VNID 2.

VTEPs 420-422 operatively encapsulate/decapsulate packets for respective network segments identified by respective VNID(s) and exchange such packets in the overlay network 402. As an example, server 430 sends a packet to VTEP 420, which packet is intended for VM 440, hosted by VTEP 422. VTEP 420 determines the intended destination for the packet (VM 440), and encapsulates the packet according to its routing table (e.g., which includes an endpoint-to-switch mappings or bindings for VTEP 422, hosting VM 440), and forwards the encapsulated packet over overlay network 402 to VTEP 422. VTEP 422 encapsulates the packet, and routes the packet to its intended destination—here, VM 440.

In some embodiments, however, the routing table may not include information associated with an intended destination. Accordingly, in such instances, VTEP 410 may be configured to broadcast and/or multicast the packet over overlay network 402 to ensure delivery to VTEP 422 (and thus, to VM 440). In addition, in preferred embodiments, the routing table is continuously and dynamically modified (e.g., removing stale entries, adding new entries, etc.), in order to maintain up-to-date entries in the routing table.

Notably, as is appreciated by those skilled in the art, the views shown herein are provided for purposes of illustration and discussion, not limitation. It is further appreciated that the host devices, servers, and VMs shown in FIG. 4 may represent a single server or VM, and/or multiple servers or VMs, such as a cluster of servers/VMs. Moreover, the VMs may be operatively configured to support virtual workloads, application workloads, resources, and/or services. In addition, in some cases, servers 430-433 can similarly host virtual workloads through respective VMs executing thereon.

As discussed above, data centers include a dynamic and complex network of interconnected devices, which present new challenges regarding performance, latency, reliability, scalability, endpoint migration, traffic isolation, and the like. Increasingly, data centers employ overlay networks to provide proper traffic isolation in multi-tenant environments. Typically, as mentioned, in such multi-tenant environments, traffic (e.g., data packets, etc.) is encapsulated and isolated for a particular network segment using an overlay protocol. Operatively, such overlay protocol often encapsulates a packet with network identifier (e.g., a virtual network identifier (VNID), etc.) to communicate the packet in a specific network segment. Challenges arise in data center networks and overlay networks, due to the complexity of interconnected devices as well as the dynamic nature of resource migration, on-demand scalability, and the like. Accordingly, the techniques described herein particularly provide improvements for managing in-band communications in data center networks (including overlay networks).

Specifically, the techniques described herein dynamically track end-point migration, preserve traffic isolation, and route and/or forward communications amongst network devices/modules (e.g., applications, network controller devices, virtual machines (VMs), and the like). In particular, these techniques are preferably employed by one or more network controller devices, which connect to a network fabric in a data center network. These techniques further offload tasks such as locating endpoints for respective leafs (and/or network controller devices) to one or more proxy devices (or devices with proxy functionality). For example, according to some embodiments discussed in greater detail below, a network controller performs address translation to identify routable addresses, encapsulates packets according to VXLAN encapsulation protocols, and forwards the encapsulated packets to a well-known proxy device (e.g., a proxy spine switch) for address resolution. The proxy device receives the encapsulated packets, determines the appropriate routable addresses, and forwards the encapsulated packets to an endpoint in an appropriate network segment based on a VNID. In operation, the proxy devices maintain, or otherwise update respective routing tables with real-time locations (e.g., addresses) for endpoints in the data center network.

Figure 5:
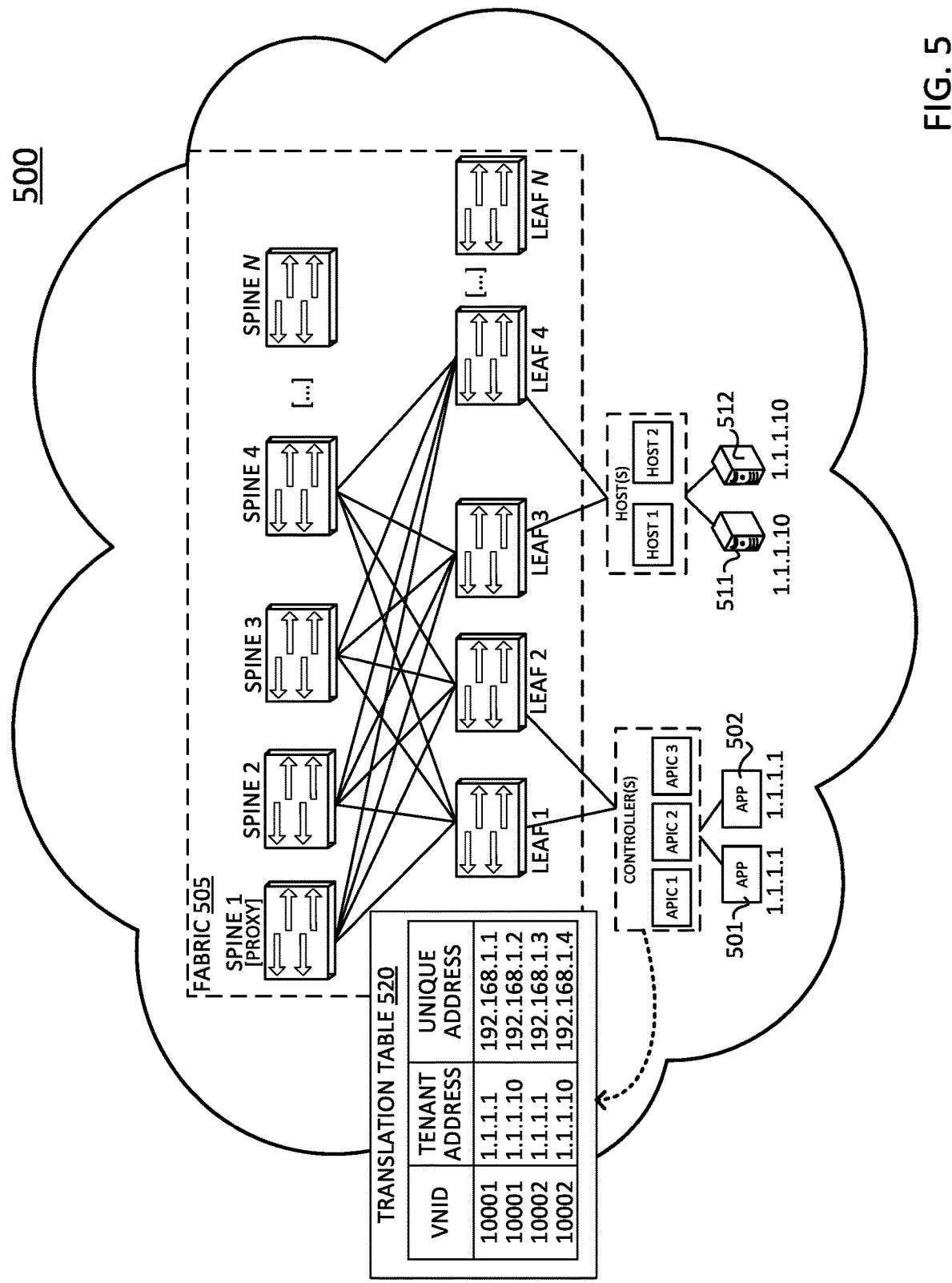
FIG. 5 illustrates another example data center network, showing an application centric infrastructure, including a network controller device.

FIG. 5 illustrates another example data center network 500, showing an application centric infrastructure that employs an application policy based solution with scalable distributed enforcement. Generally, data center network 500 supports integration of physical and virtual environments under one declarative policy model for networks, servers, services and security.

Data center network 500 comprises a network fabric 505 that employs an overlay protocol such as a VXLAN overlay protocol. As discussed above, a VXLAN overlay protocol encapsulates/decapsulates and routes packets according to a VXLAN network identifier (VNID) carried in a header field. The VNID identifies a specific virtual network or network segment associated with one or more tenants. In addition, data center network 500 also includes one or more software defined networking controller devices, also referred to as application policy infrastructure controllers (APICs)—here, APIC 1-3—which provide a single point for automation and management.

Fabric 505 includes spine switches 1-N and leaf switches 1-N. As shown, spine switch 1 is designated as a proxy devices or a VXLAN proxy switch (in the VXLAN overlay protocol). Operationally, unknown VXLAN traffic in fabric 505 is forwarded to proxy switches for address resolution and further routing in the data center network and/or within respective overlay networks.

Leaf switches 1 and 2 are further connected to one or more network controller devices APICs 1, 2, and 3, and leaf switches 3 and 4 are connected to host devices 1 and 2. Host devices 1 and 2 can include, for example, physical or virtual devices such as servers, switches, routers, virtual machines, and the like. Here, hosts 1 and 2 host or execute two service VMs 511 and 512. Each VM 511 and VM 512 serves different tenants associated with respective tenant segments in an overlay network.

Overlay networks, as discussed above, are often employed in data center networks to isolate traffic amongst tenants. Typically, a network segment or tenant segment is associated with a tenant using a VNID. In data center network 500, VM 511 communicates in a network segment in common with application ("app") 501, which executes on one or more of APICs 1, 2, and/or 3, and VM 512 communicates in a network segment in common with application ("app") 502, which also executes on one or more APICs 1, 2, and/or 3. Due to network segment isolation, VM 511 and VM 512 may be assigned the same IP address—here, 1.1.1.10.

In operation, app 501 and app 502 send in-band communications (e.g., data packets) over network fabric 505 to respective service VMs 511, 512, and likewise, VMs 511, 512 send in-band communications over network fabric 505 to app 501, 502, respectively. Typically, communications between respective applications and VMs are maintained (e.g., persistent) even if the VM migrates amongst hosts in order to maintain proper routing information.

Regarding traffic isolation for in-band communications, the techniques herein (such as the in-band communication process/services 244) employ a VNID based address translation, where overlapping or shared tenant addresses—here, 1.1.1.10 for VMs 511, 512—are translated into a unique (e.g., different) loopback address according to translation tables indexed or keyed to one or more VNIDs.

For example, a network controller device such as APIC 1 establishes a translation table for in-band traffic in data center network 500 to translate potentially ambiguous addresses. Here, APIC 1 establishes a translation table 520 that includes entries indexed according to a unique address (e.g., loopback address), a VNID for a tenant segment, and/or a routable tenant address. Notably, the routable tenant address in routing table 520 is a public address while the unique address is a private address within data center network 500.

As discussed, although the same or common routable addresses (1.1.1.10, and 1.1.1.1) may be used to identify more than one app, VM, or other computing resource in data center network 500, an encapsulation scheme (e.g., VXLAN) for a packet carrying the common routable address will also include a VNID in a header field. The network controller devices use the common routable address along with the VNID to translate the common routable address into a corresponding unique address. Alternatively (or in addition), the network controller devices may similarly translate a unique address into a common routable address and a VNID so that network devices within fabric 505 can properly route/forward the packet to an appropriate endpoint.

For example, a packet from VM 511 (1.1.1.10) is encapsulated with VNID 10001, while a packet from VM 512 (1.1.1.10) is encapsulated with VNID 10002. The proxy spine switch 1 receives the packets from VM 511 and/or VM 512 and forwards to one of the APICs shown for further translation (APIC 1 for example). APIC 1 receives and decapsulates the packets from proxy spine switch 1 to determine respective VNIDs and routable tenant addresses. APIC 1 further translates the routable tenant addresses based on the VNID into unique addresses (e.g., loopback addresses) for respective applications, and forwards the message to the appropriate application(s). Here, for example, an encapsulated packet originating from VM 511 will have a VXLAN header indicating VNID 10001, an inner source address field of 1.1.1.10, and an inner destination address field of 1.1.1.1, while an encapsulated packet originating from VM 512 will have a VXLAN header indicating 10002, an inner source field of 1.1.1.10 and an inner destination address field of 1.1.1.1. The APIC receiving such packets will translate the inner source/destination address fields (e.g., which include routable addresses) into unique loopback addresses based on translation table 520. Specifically, the inner source address field of 1.1.1.10 in VNID 10001 translates into 192.168.1.2 (corresponding to VM 511), and the inner destination address field of 1.1.1.1 in VNID 10001 translates into 192.168.1.1 (corresponding to app 501). In this fashion, the network device controllers (APICs) can translate potentially ambiguous routable tenant addresses (e.g., common or shared by more than one network device) into a unique address/loopback address.

Similarly, applications—here, apps 1, 2—can likewise have a shared or common routable tenant address when operating in different network segments. For example, the same address for app 501, 502 (1.1.1.1) is translated into different loopback addresses (192.168.1.1 and 192.168.1.3) for different tenant segments based on the VNID associated with a particular network segment. Here, app 501 and app 502 are bound to IP address 192.168.1.1 and 192.168.1.3, respectively, and communicate with VM 511, 512, respectively. App 501 sends a packet intended for VM 511 to one of the network controller devices (e.g., APIC 1) for address translation. The packet from app 501 includes 192.168.1.1 and 192.168.1.2 as an inner source and a destination IP address, respectively. APIC 1 receives the packet from app 501 and translates the inner source and destination IP address into routable tenant addresses 1.1.1.1 and 1.1.1.10, respectively. APIC 1 further encapsulates the packet from app 501 with VNID 10001 in a VXLAN header based on translation table 520.

The in-band communication techniques discussed above consolidate address translation in one or more network controller devices while respecting traffic isolation between different network segments. Notably, the translation tables used by the network controller devices may be local and/or distributed across multiple networks devices. Further, as discussed, the routing tables include entries keyed or indexed according to VNIDs, routable tenant addresses, and/or unique (loopback) addresses. Based on a combination of a VNID, a routable tenant address, and/or a unique address, the network controller device can translate between routable tenant addresses and unique addresses and/or identify an appropriate VNID for a packet (which VNID is used when encapsulating the packet for forwarding to the proxy device(s)).

Figure 6:
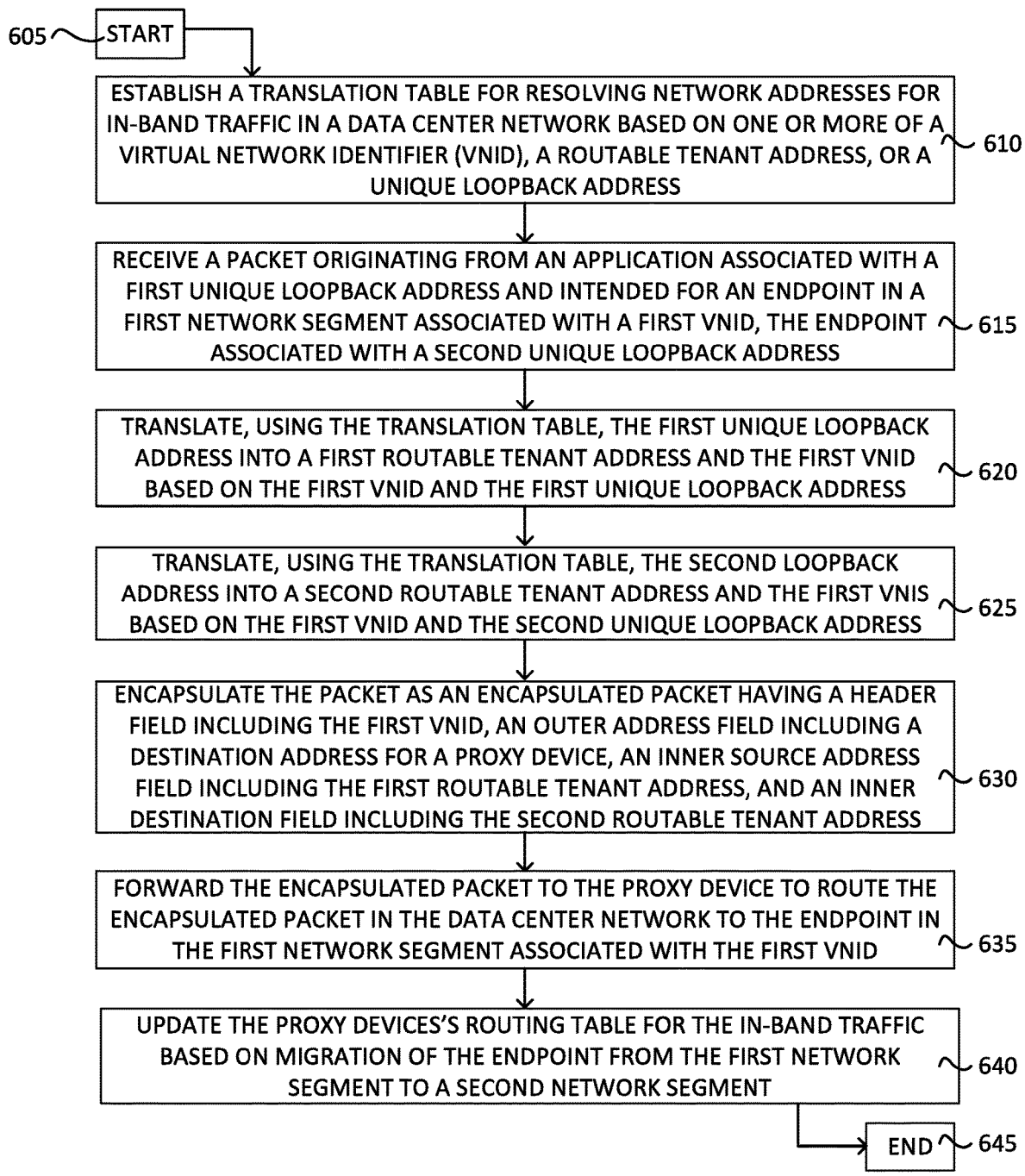
FIG. 6 illustrates an example simplified procedure for managing in-band communications over an overlay network, particularly from the perspective of the network controller device shown in FIG. 5.

FIG. 6 illustrates an example simplified procedure 600 for managing in-band communications over an overlay network, particularly from the perspective of a network controller device (e.g., APIC(s) 1-3). Procedure 600 begins at step 605 and continues on to step 610 where, as discussed above, the network controller device establishes a translation table (e.g., local, distributed, etc.) for resolving network addresses for in-band traffic in a data center network based on one or more of a virtual network identifier (VNID), a routable tenant address, or a unique loopback address.

Procedure 600 continues to step 615, where operatively, the network controller device receives a packet originating from an application associated with a first unique loopback address. Notably, the packet is also intended for an endpoint in a first network segment associated with a first VNID, and the endpoint is associated with a second unique loopback address. The network controller, in steps 620 and 625, further translates, using the translation table (e.g., translation table 520), the first unique loopback address into a first routable tenant address and a first VNID, and the second unique loopback address into a second routable tenant address and the first VNID based the first unique loopback address and the second unique loopback address, respectively. Once translated, the network controller encapsulates (e.g., VXLAN encapsulation), in step 625, the packet as an encapsulated packet having a header field including the first VNID, an outer address field including an address for a proxy device (to forward to a proxy device in the network fabric), an inner source address field including the first routable tenant address, and an inner destination field including the second routable tenant address.

The network controller device further forwards the encapsulated packet, in step 635, to the proxy device to route the encapsulated packet in the data center network to the endpoint in the first network segment associated with the first VNID. The proxy device, as discussed above, receives and decapsulates the packet to determine appropriate routing/forwarding and sends the packet to the endpoint. Notably, in some embodiments, the proxy device tunnels the packet to the endpoint (e.g., in the overlay network/first network segment).

In addition, the proxy device may also update its routing table, in step 640, based on migration of the endpoint from the first network segment to a second network segment, or other such dynamic movement of computing resources. Procedure 600 subsequently ends at step 645, but may continue on to step 615 where the network controller device receives packets from the application (or other applications).

Figure 7:
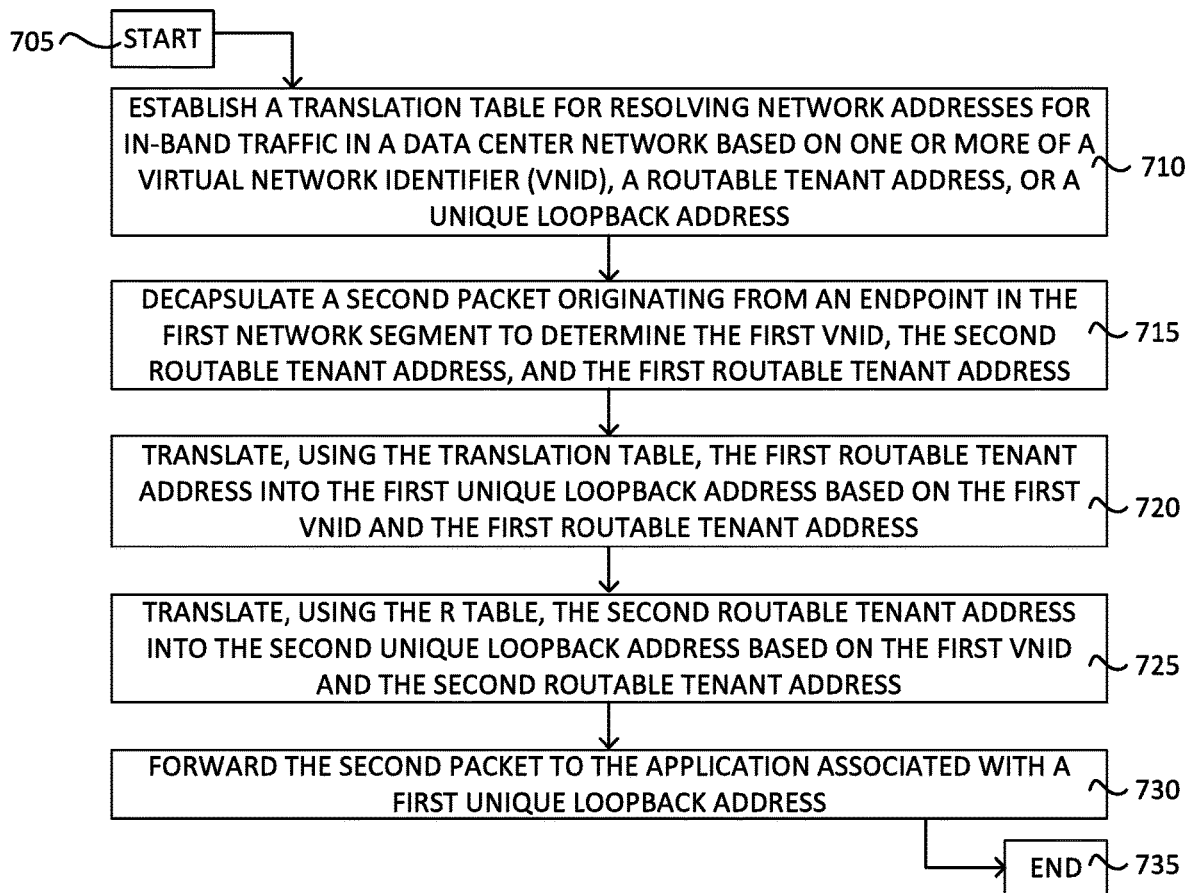
FIG. 7 illustrates another example simplified procedure for managing in-band communications over an overlay network, particularly from the perspective of the network controller device shown in FIG. 5.

FIG. 7 illustrates another example simplified procedure 700 for managing in-band communications over an overlay network, again from the perspective of a network controller device (e.g., APIC(s) 1-3). Here, procedure 700 describes steps for translating in-band traffic from one or more endpoints (e.g., VMs 511, 512, etc.) to one or more applications (e.g., app 1, app 2, etc.).

Procedure 700 begins at step 705 and continues on to step 710 where, similar to procedure 600, the network controller device establishes a translation table (e.g., local, distributed, etc.) for resolving network addresses for in-band traffic in a data center network based on one or more of a virtual network identifier (VNID), a routable tenant address, or a unique loopback address. Notably, the translation table may be the same as the one provided in procedure 600.

Procedure 700 continues to step 715 where the network controller device decapsulates a second packet originating from the endpoint in first network segment to determine the first VNID, the second routable tenant address, and the first routable tenant address.

The network controller device further translates, in steps 720, 725 the first routable tenant address and the second routable tenant address (e.g., using translation table 520) into the first unique loopback address and the second unique loopback address, respectively, based at least on the first VNID. The network controller device further forwards the second packet to the appropriate application associated with the first unique loopback address. Procedure 700 subsequently ends at step 735, but may continue on to step 715 where the network controller device decapsulates packets from endpoints in corresponding network segments.

It should be noted that certain steps within procedures 600-700 may be optional, and further, the steps shown in FIGS. 6-7 are merely examples for illustration—certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

In addition to the embodiments described above, additional embodiments of this disclosure provide a scalable VNID mapping table proportional in size with VNIDs for network segments and/or VRF instances in an overlay network. For example, according to one of these embodiments, the in-bound communication techniques leverage Linux VRF instances and a universal TUN/TAP driver and, in particular, tie the fabric VRF instances and the Linux VRF instances together by mapping a TAP interface with a VNID for a network segment.

Figure 8:
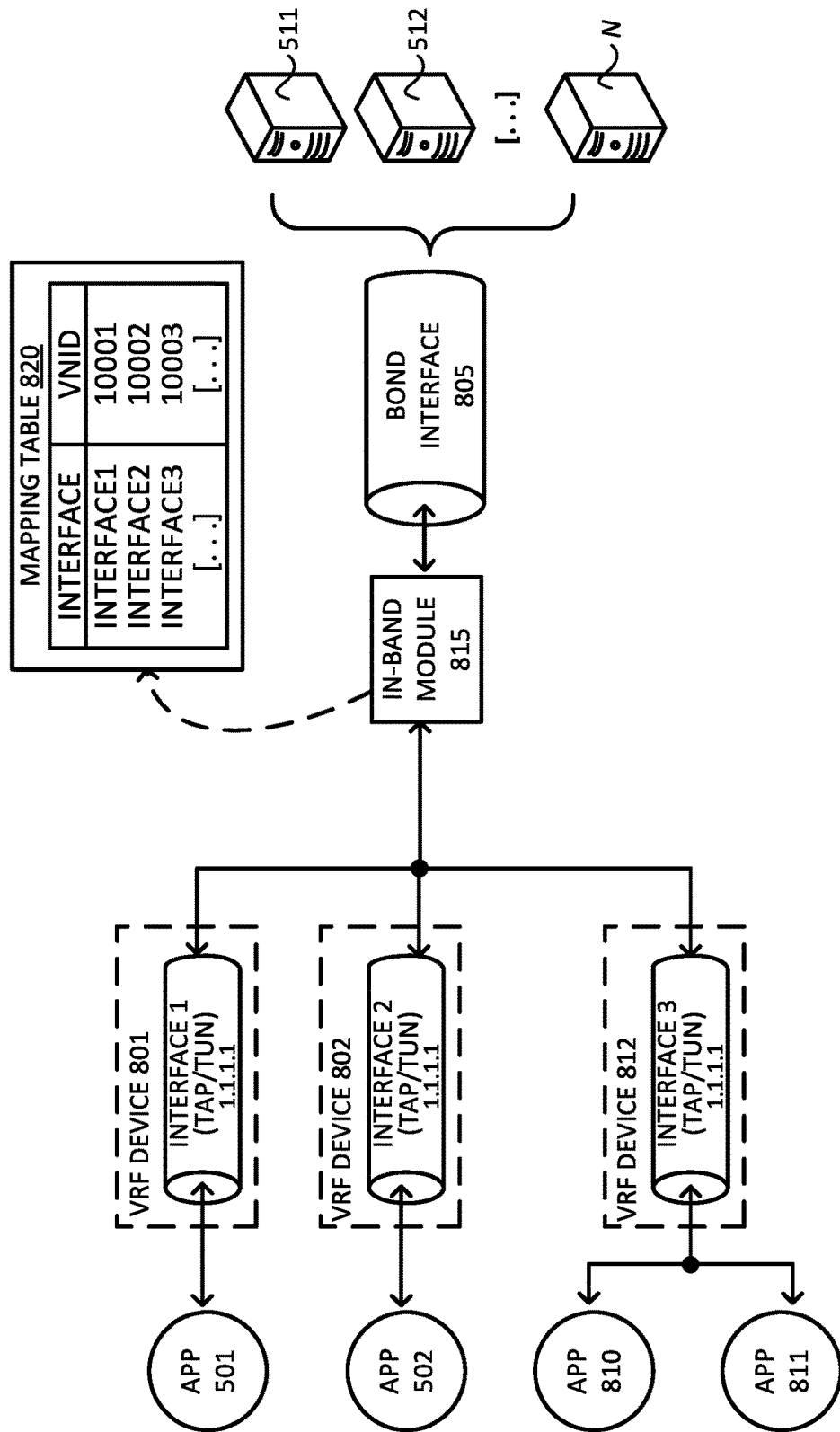
FIG. 8 illustrates an example network architecture that supports scalable VNID based routing techniques according to another embodiment of this disclosure.

In detail, FIG. 8 illustrates an example network architecture 800 that supports scalable VNID based mapping techniques. As shown in network architecture 800, apps 501, 502, 810, and 811 communicate over respective interfaces (e.g., TAP/TUN interfaces, bond interface 805, etc.) with one or more computing resources—here, service virtual machines (VMs) 511-N. Network architecture also includes an in-band module 815 (e.g., a user space daemon, etc.) that manages and/or otherwise coordinates forwarding traffic between the applications, including respective VRF devices 801, 802, 812, and VMs 511, 512 (through VM-N).

In operation, a network controller (not shown) (e.g., one of APICs 1-3) creates a Linux VRF instance for each fabric VRF instance. As discussed below, a fabric VRF instance refers to a context for a network segment associated with a VNID (e.g., a tenant network segment). As shown, Linux VRF instances incorporate the fabric VRF context in a VRF device—e.g., VRF devices 801, 802, and 812. The network controller further creates or instantiates an enslaved interface for each VRF instance/device—e.g., interface 1, interface 2, interface 3—which are illustrated as TAP/TUN interfaces. Applications (apps 501, 502, 810, 812) are tied, respectively, to interfaces on corresponding VRF devices. Notably, apps 810 and 811 operate in the same network segment (e.g., VNID 10003) and shown as tied or bound to a shared interface 3 on VRF device 812.

In general, in-band module 815 executes or runs on the network controller and constructs a mapping table 820 to map interfaces with VNIDs (associated with respective network segments). In-band module 815 maintains mapping table 820 and performs VXLAN tunneling for traffic exchanged between applications and computing resources (here, VMs). In-band module 815 updates entries in mapping table 820 when interfaces are created (and/or deleted).

As shown, mapping table 820 maps an aggregation of interfaces to respective VNIDs used by the fabric VRF. Mapping table 820 maps each interface with a corresponding VNID associated with a network segment. For example, interface 1 is mapped to VNID 10001 used by the fabric VRF or network segment common with VM 511. Accordingly, in-band module 815 directs traffic destined for app 501 (which operates in the network segment associated with VNID 10001) to interface 1. In greater detail, consider a packet (e.g., a VXLAN encapsulated packet) sent from VM 511 to app 501, coming in from a channel bonding interface 805 (e.g., which represents a channel bonding interface and/or an aggregation of interfaces). In-band module 815 listens, monitors, or otherwise receives the encapsulated packet from bond interface 805 on an UDP socket bound to a reserved port number. In-band module 815 further performs decapsulation (e.g., VXLAN decapsulation) and determines the VNID—here, VNID 10001—from the encapsulated packet header. In-band module 815 identifies an associated interface (e.g., interface 1) and corresponding enslaved VRF device (e.g., VRF device 1) based on a mapping table lookup. In-band module 815 then writes the decapsulated packet into interface 1, which is received by app 501 tied to VRF device 801. Conversely, app 501 sends a packet to VM 511, the packet is forwarded to interface 1 because interface 1 is the next hop of a default route in VRF device 801. The packet is picked up by in-band module 815, which listens to traffic on interface 1. In-band module 815 performs VXLAN encapsulation, using VNID 10001 in the VXLAN header. The VNID for the received packet is determined by mapping table 820 and a lookup, using interface 1 as the key. In-band module 815 further sends the encapsulated packet through the UDP socket to bond interface 805.

As shown in mapping table 820, each VNID is mapped to a single interface. In this fashion, mapping table 820 remains proportional to a number of VRF instances (e.g., network segments) mapped to respective interfaces. Given a large number of fabric VRF instances, mapping table 820 scales efficiently, because its size is unrelated to the number of service VMs in a fabric VRF.

Figure 9:
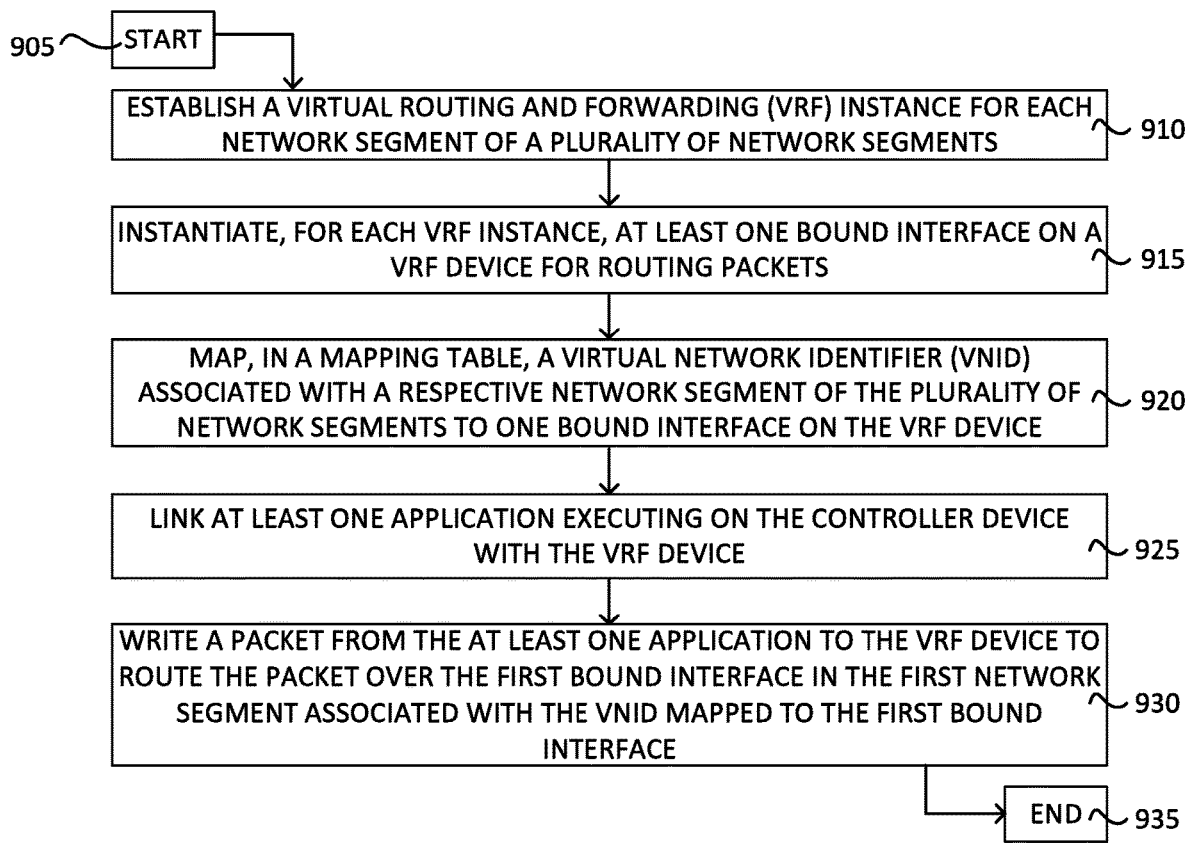
FIG. 9 illustrates an example simplified procedure for managing in-band communications over an overlay network, particularly from the perspective of the network controller device shown in FIG. 5.

FIG. 9 is an example of simplified procedure 900 for managing in-band communications over an overlay network, particularly from the perspective of a network controller device (e.g., one of APICs 1-3 shown in FIG. 5).

Procedure 900 begins at step 905 and continues on to step 910 where, as discussed above, the network controller device establishes a virtual routing and forwarding (VRF) instance for each network segment of a plurality of network segments. The network controller, at step 915, further instantiates, for each VRF instance, at least one bound interface on a VRF device. As discussed, the bound interface can include, for example, a TAP/TUN interface (e.g., interfaces 1-3 in FIG. 8), which are enslaved to respective VRF devices. Procedure 900 continues to step 920 where the network controller device maps one or more virtual network identifiers (VNIDs) to one or more respective bound interfaces on corresponding VRF devices. For example, referring again to mapping table 820, the network controller device (e.g., and/or in-band module 815, which executes on the network controller device) maps an interface on respective VRF device to a VNID associated with a network segment.

Further, in step 925, the network controller device links or associates one or more applications with the VRF device, and thus, links the one or more applications the respective interface(s) on the VRF device. Procedure 900 continues to step 930 where the network controller and/or the application executing/running on the network controller sends or writes a packet to the linked VRF device, which is a default next hop, in order to route the packet in a network segment over an interface of the VRF device. Typically, an in-band module executing on the network controller device listens to the tap interface, receives the packet, determines the VNID mapped to the interface from a mapping table (e.g., mapping table 820), and tunnels the packet to an appropriate computing resource (e.g., a service VM). Procedure 900 subsequently ends at step 935, but may continue on to step 910 where the network controller device establishes VRF instances for network segments, discussed above.

It should be noted that certain steps within procedure 900 may be optional, and further, the steps shown in FIG. 9 are merely examples for illustration—certain other steps may be included or excluded as desired. Further, while a particular order of the steps is shown, this ordering is merely illustrative, and any suitable arrangement of the steps may be utilized without departing from the scope of the embodiments herein. In addition, although procedure 900 is described with respect to a network controller device, certain operations may be executed by devices or modules running on the network controller device (e.g., in-band module 815, etc.).

The techniques described herein manage in-band traffic in a data center network, and in particular, traffic within network segments. These techniques further support endpoint migration for in-band communications using local and/or aggregated translation and mapping tables that may index entries according to VNIDs, tenant addresses, unique (loopback) addresses, bound network interfaces (TAP/TUN interfaces), and combinations thereof.

While there have been shown and described illustrative embodiments for managing in-band communications in a data center network, it is to be understood that various other adaptations and modifications may be made within the spirit and scope of the embodiments herein. For example, the embodiments have been shown and described herein with relation to network switches and a control plane comprising the network switches. However, the embodiments in their broader sense are not as limited, and may, in fact, be used with any number of network devices (e.g., routers), and the like. In addition, the embodiments are shown with certain devices/modules performing certain operations (e.g., APICs 1-3, proxy spine switch 1, in-band module 715, and the like), however, it is appreciated that various other devices may be readily modified to perform operations without departing from the sprit and scope of this disclosure. Moreover, although the examples and embodiments described herein particularly refer to VXLAN protocols, the embodiments in their broader sense may be applied to any known encapsulation protocols, as is appreciated by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   receiving, by a network controller device, a packet intended for an endpoint;
   translating, by the network controller device using a table, a first loopback address into a first routable tenant address;
   translating, by the network controller device using the table, a second loopback address into a second routable tenant address;
   encapsulating the packet as an encapsulated packet having a header field, an outer address field including an address for a proxy device, an inner source address field including the first routable tenant address, and an inner destination field including the second routable tenant address;
   forwarding, by the network controller device, the encapsulated packet to the proxy device; and
   updating a routing table of the proxy device based on migration of the endpoint.

2. The method of claim 1, further comprising:
   decapsulating, by the network controller device, a second packet originating from the endpoint to determine the second routable tenant address and the first routable tenant address;
   translating, by the network controller device using the table, the first routable tenant address into the first loopback address based on at least the first routable tenant address;
   translating, by the network controller device using the table, the second routable tenant address into the second loopback address based on at least the second routable tenant address; and
   forwarding, by the network controller device, the second packet to an application associated with a first unique loopback address.

3. The method of claim 1, wherein updating of the routing table of the proxy device based on the migration of the endpoint is performed via the proxy device.

4. The method of claim 1, wherein forwarding the encapsulated packet to the proxy device further causes the proxy device to decapsulate the encapsulated packet to determine a virtual network identifier (VNID) and the second routable tenant address.

5. The method of claim 1, further comprising:
   establishing, by the network controller device, the table for resolving network addresses for in-band traffic in a data center network based on one or more of a virtual network identifier (VNID), a routable tenant address, or a unique loopback address; and
   indexing, in the table, each loopback address of a plurality of loopback addresses according to one respective VNID and one respective tenant address.

6. The method of claim 5, wherein the VNID is a virtual extensible LAN (VXLAN) identifier.

7. The method of claim 1, wherein the endpoint is a virtual machine (VM) hosted by a leaf node in a data center network.

8. A network controller device comprising:
   one or more computer processors; and
   a memory storing instructions that, when executed by the one or more computer processors, cause the network controller device to:
      receive a packet intended for an endpoint,
      translate, using a table, a first loopback address into a first routable tenant address,
      translate, using the table, a second loopback address into a second routable tenant address,
      encapsulate the packet as an encapsulated packet having a header field including an outer address field including an address for a proxy device, an inner source address field including the first routable tenant address, and an inner destination field including the second routable tenant address,
      forward the encapsulated packet to the proxy device, and
      update a routing table of the proxy device based on migration of the endpoint.

9. The network controller device of claim 8, wherein the instructions further cause the network controller device to:
   decapsulate a second packet originating from the endpoint in to determine the second routable tenant address and the first routable tenant address;
   translate, using the table, the first routable tenant address into the first loopback address based on at least the first routable tenant address;
   translate, using the table, the second routable tenant address into the second loopback address based on at least the second routable tenant address; and
   forward the second packet to an application associated with a first unique loopback address.

10. The network controller device of claim 8, wherein the proxy device updates the routing table of the proxy device based on the migration of the endpoint from a first host to a second host.

11. The network controller device of claim 8, wherein forwarding the encapsulated packet to the proxy device further causes the proxy device to decapsulate the encapsulated packet to determine a virtual network identifier (VNID) and the second routable tenant address.

12. The network controller device of claim 8, wherein the instructions further cause the network controller device to:
   establish the table for resolving network addresses for in-band traffic in a data center network based on one or more of a virtual network identifier (VNID), a routable tenant address, or a unique loopback address; and
   index, in the table, each loopback address of a plurality of loopback addresses according to one respective VNID and one respective tenant address.

13. The network controller device of claim 12, wherein the VNID is a virtual extensible LAN (VXLAN) identifier.

14. The network controller device of claim 8, wherein the endpoint is a virtual machine (VM) hosted by a leaf node in a data center network.

15. A non-transitory computer-readable medium storing instructions that, when executed by a network controller device, cause the network controller device to:
   receive a packet intended for an endpoint;
   translate, using a table, a first loopback address into a first routable tenant address;
   translate, using the table, a second loopback address into a second routable tenant address;

encapsulate the packet as an encapsulated packet having a header field including an outer address field including an address for a proxy device, an inner source address field including the first routable tenant address, and an inner destination field including the second routable tenant address;

forward the encapsulated packet to the proxy device; and update a routing table of the proxy device based on migration of the endpoint.

16. The non-transitory computer-readable medium of claim 15, wherein the instructions further cause the network controller device to:

decapsulate a second packet originating from the endpoint to determine the second routable tenant address and the first routable tenant address;

translate, using the table, the first routable tenant address into the first loopback address based on at least the first routable tenant address;

translate, using the table, the second routable tenant address into the second loopback address based on at least the second routable tenant address; and forward the second packet to an application associated with a first unique loopback address.

17. The non-transitory computer-readable medium of claim 15, wherein the proxy device updates the routing table of the proxy device based on the migration of the endpoint from a first host to a second host.

18. The non-transitory computer-readable medium of claim 15, wherein forwarding the encapsulated packet to the proxy device further causes the proxy device to decapsulate the encapsulated packet to determine a virtual network identifier (VNID) and the second routable tenant address.

19. The non-transitory computer-readable medium of claim 15, wherein the instructions further cause the network controller device to:

establish the table for resolving network addresses for in-band traffic in a data center network based on one or more of a virtual network identifier (VNID), a routable tenant address, or a unique loopback address; and index, in the table, each loopback address of a plurality of loopback addresses according to one respective VNID and one respective tenant address.

20. The non-transitory computer-readable medium of claim 19, wherein the VNID is a virtual extensible LAN (VXLAN) identifier.

* * * * *